(12) United States Patent
Shinya

(10) Patent No.: US 8,792,144 B2
(45) Date of Patent: Jul. 29, 2014

(54) IMAGE READING DEVICE AND IMAGE READING METHOD

(71) Applicant: Mitsuo Shinya, Kanagawa (JP)

(72) Inventor: Mitsuo Shinya, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 56 days.

(21) Appl. No.: 13/709,547

(22) Filed: Dec. 10, 2012

(65) Prior Publication Data
US 2013/0148171 A1 Jun. 13, 2013

(30) Foreign Application Priority Data

Dec. 12, 2011 (JP) ................. 2011-271617

(51) Int. Cl.
*G06K 15/02* (2006.01)
*H04N 1/393* (2006.01)

(52) U.S. Cl.
USPC ........................... 358/451; 358/1.2

(58) Field of Classification Search
USPC ................... 358/1.2, 451
See application file for complete search history.

(56) References Cited

U.S. PATENT DOCUMENTS

2008/0278107 A1 11/2008 Fukunaga et al.

FOREIGN PATENT DOCUMENTS

JP 09-130560 5/1997

*Primary Examiner* — Barbara Reinier
(74) *Attorney, Agent, or Firm* — Oblon, Spivak, McClelland, Maier & Neustadt, L.L.P.

(57) ABSTRACT

An image reading device includes an arbitrating unit configured to obtain read data on a main-scan-line-by-main-scan-line basis from a first image sensor that reads one side of a document and read data on a main-scan-line-by-main-scan-line basis from a second image sensor that reads the other side of the document. The arbitrating unit transfers a piece of read data obtained from the first image sensor and the second image sensor alternately. The device also includes a reducing unit configured to perform reduction in image data including the read data in a sub-scanning direction in a way that thins on the transferred pieces of read data corresponding respectively to main scan lines; an image processing unit configured to perform image processing on the read data having undergone the thinning; and a transfer unit configured to transfer the read data having undergone the image processing to another unit.

8 Claims, 6 Drawing Sheets

IMAGE READING DEVICE AND IMAGE READING METHOD

CROSS-REFERENCE TO RELATED APPLICATION

The present application claims priority to and incorporates by reference the entire contents of Japanese Patent Application No. 2011-271617 filed in Japan on Dec. 12, 2011.

BACKGROUND OF THE INVENTION

1. Field of the Invention

The present invention relates to an image reading device and an image reading method.

2. Description of the Related Art

There is a trend to promote computerization in recent years. This trend makes image processing apparatuses such as printers and facsimiles used to output computerized information and scanners used to computerize documents indispensable equipment. Such an image processing apparatus is typically configured as a multifunction peripheral having an image capturing function, an image forming function, a communication function, and the like and operable as a printer, a facsimile, a scanner, and a copier.

Among these image processing apparatuses, some type of scanners used to computerize documents is capable of reading two sides of a document simultaneously. Image data generated by a reading process is input to a circuit that performs various image processing on the image data. A frequency (hereinafter, "input frequency") at which data can be input to this image processing circuit depends on performance of the image processing circuit.

Meanwhile, image data generated by the scanner as described above that performs two-sided reading is doubled in data amount. Accordingly, it is difficult to input the generated image data to the image processing circuit in real time due to the input frequency of the image processing circuit.

To solve such a problem, a method of providing a buffer upstream of the image processing circuit or a method of compressing image data generated by a reading process and inputting the compressed image data to the image processing circuit, which is disclosed in Japanese Patent Application Laid-open No. H9-130560 for example, is used.

However, the method of compressing image data disclosed in Japanese Patent Application Laid-open No. H9-130560 requires the image processing circuit, to which the compressed image is to be input, to decompress the compressed data before performing image processing. This leads to a problem such as an increase in circuit scale, and an increase in complexity of circuit logic which results in a decrease in processing efficiency and a decrease in input frequency incidental thereto.

When lossy compression is employed as a compression method, some data is lost, resulting in degradation in image quality. When lossless compression is employed, the image quality does not degrade but processing becomes complicated instead, causing the problems described above to arise.

Furthermore, there can be a case where an image processing circuit of a scanner performs pixel thinning to lower the resolution of read data to a resolution desired by a user. In this case, even when all read data is transferred using the compression or other method described above, pixel thinning is performed on the read data as specified by a user, making processing inefficient.

Therefore, there is a need for an image reading device and an image reading method to enhance efficiency in transfer of read-image data of a scanner capable of two-sided reading.

SUMMARY OF THE INVENTION

It is an object of the present invention to at least partially solve the problems in the conventional technology.

According to an embodiment, there is provided an image reading device that includes a two-side-data arbitrating unit configured to obtain read data on a main-scan-line-by-main-scan-line basis from a first image sensor that reads one side of a document and read data on a main-scan-line-by-main-scan-line basis from a second image sensor that reads the other side of the document, the two-side-data arbitrating unit transferring a piece of read data obtained from the first image sensor and a piece of read data obtained from the second image sensor alternately; a sub-scanning-data reducing unit configured to perform reduction in image data including the read data in a sub-scanning direction in a way that discards the transferred piece of read data corresponding to a main scan line according to setting to perform thinning on the pieces of read data corresponding respectively to main scan lines; an image processing unit configured to perform image processing on the read data having undergone the thinning; and a transfer unit configured to transfer the read data having undergone the image processing to another unit.

According to another embodiment, there is provided an image reading method that includes obtaining read data on a main-scan-line-by-main-scan-line basis from a first image sensor that reads one side of a document and read data on a main-scan-line-by-main-scan-line basis from a second image sensor that reads the other side of the document; transferring a piece of read data obtained from the first image sensor and a piece of read data obtained from the second image sensor alternately; performing reduction in image data including the read data in a sub-scanning direction in a way that discards the transferred piece of read data corresponding to a main scan line according to setting to perform thinning on the pieces of read data corresponding respectively to main scan lines; performing image processing on the read data having undergone the thinning; and transferring the read data having undergone the image processing to another unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings. The embodiments are described by way of examples in which a multifunction peripheral (MFP) is employed as an image reading device. The image reading device is not necessarily an MFP, and can alternatively be a copier, a printer, or a facsimile, for example.

Figure 1:
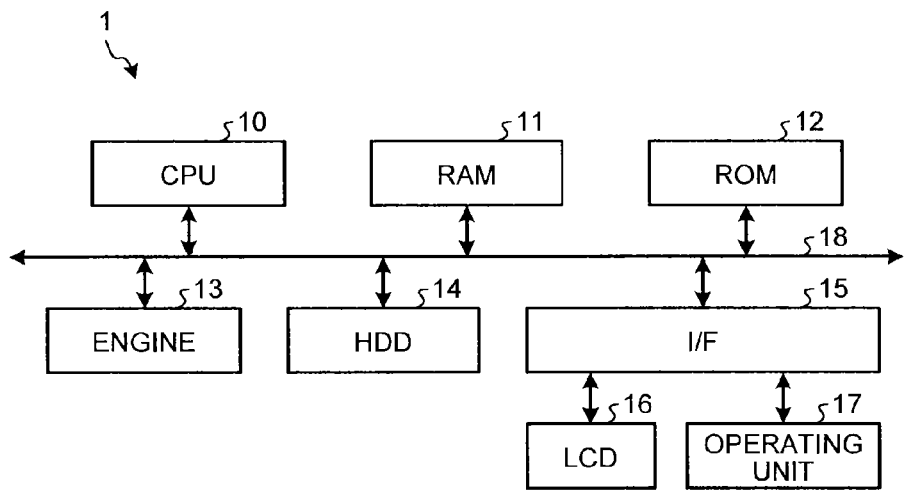
FIG. 1 is a block diagram illustrating a hardware structure of an image forming apparatus according to an embodiment of the present invention.

FIG. 1 is a block diagram illustrating a hardware structure of an MFP 1 according to an embodiment of the present invention. As illustrated in FIG. 1, the MFP 1 according to the present embodiment has a similar structure to that of a commonly-used server or a commonly-used information processing terminal such as a personal computer (PC), but additionally includes an engine that performs image reading. More specifically, the MFP 1 according to the present embodiment includes a central processing unit (CPU) 10, a random access memory (RAM) 11, a read only memory (ROM) 12, an engine 13, a hard disk drive (HDD) 14, and an interface (I/F) 15 that are connected to one another via a bus 18. A liquid crystal display (LCD) 16 and an operating unit 17 are connected to the I/F 15.

The CPU 10 is a computing unit and controls operation of the entire MFP 1. The RAM 11 is a volatile storage medium capable of high-speed information reading and writing, and used as a working area when the CPU 10 processes information. The ROM 12 is a read-only nonvolatile storage medium and stores therein programs such as firmware. The engine 13 is a mechanism that actually performs image reading in the MFP 1 and includes a photoelectric transducer and an image processing circuit. The engine 13 also includes an image forming mechanism that performs image forming.

The HDD 14 is a nonvolatile storage medium capable of reading and writing information. An operating system (OS), various control programs, an application program, and the like are stored in the HDD 14. The I/F 15 connects the bus 18 to various hardware, a network, and the like and controls the connection. The LCD 16 is a visual user interface that allows a user to check a status of the MFP 1. The operating unit 17 is a user interface such as a keyboard and a mouse, allowing a user to input information to the MFP 1.

In such a hardware structure, a program stored in the ROM 12, the HDD 14, or a storage medium (not shown) such as an optical disk is loaded into the RAM 11. The CPU 10 performs computations in accordance with the program, thereby configuring a software control unit. Functional blocks that carry out functions of the MFP 1 according to the present embodiment are implemented via a combination of the software control unit configured as described above and hardware.

Figure 2:
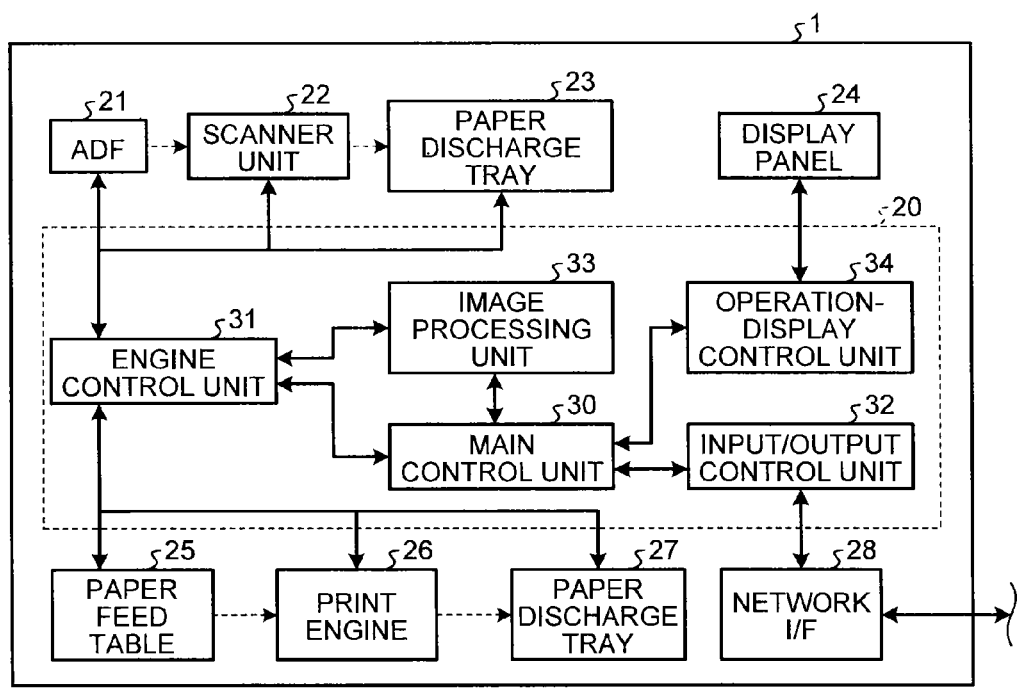
FIG. 2 is a diagram illustrating a functional configuration of the image forming apparatus according to the embodiment.

A functional configuration of the MFP 1 according to the present embodiment is described below with reference to FIG. 2. FIG. 2 is a block diagram illustrating the functional configuration of the MFP 1 according to the present embodiment. As illustrated in FIG. 2, the MFP 1 according to the present embodiment includes a controller 20, an automatic document feeder (ADF) 21, a scanner unit 22, a paper discharge tray 23, a display panel 24, a paper feed table 25, a print engine 26, a paper discharge tray 27, and a network I/F 28.

The controller 20 includes a main control unit 30, an engine control unit 31, an input/output control unit 32, an image processing unit 33, and an operation-display control unit 34. As illustrated in FIG. 2, the MFP 1 according to the present embodiment is an MFP that includes the scanner unit 22 and the print engine 26. In FIG. 2, solid-line arrows indicate electrical connections, and broken-line arrows indicate flows of paper.

The display panel 24 is an output interface that visually displays a status of the MFP 1 and also an input interface (operating unit) used as a touch screen when a user directly operates the MFP 1 or inputs information to the MFP 1. The network I/F 28 is an interface provided to allow the MFP 1 to communicate with other equipment via a network. An Ethernet (registered trademark) or universal serial bus (USB) interface is used as the network I/F 28.

The controller 20 is implemented via a combination of software and hardware. More specifically, a control program such as firmware stored in a nonvolatile storage medium such as the ROM 12, a nonvolatile memory, the HDD 14, or an optical disk is loaded into a volatile memory (hereinafter, "memory") such as the RAM 11 to configure the software control unit according to control of the CPU 10. The controller 20 is made up of the software control unit and hardware such as an integrated circuit. The controller 20 functions as a control unit that controls the entire MFP 1.

The main control unit 30 serves a function of controlling the units included in the controller 20 and supplies instructions to the units of the controller 20. The engine control unit 31 serves as a driving unit that controls or drives the print engine 26, the scanner unit 22, and the like. The input/output control unit 32 inputs signals and instructions input to the MFP 1 via the network I/F 28 to the main control unit 30. The main control unit 30 accesses other equipment by controlling the input/output control unit 32 and via the network I/F 28.

The image processing unit 33 generates drawing data based on print data contained in an input print job under control of the main control unit 30. The drawing data is data for use by the print engine 26 which is an image forming unit in drawing an image to be formed in an image forming operation, and is pixel data, or, more specifically, data about pixels that make up the image to be output. The print data included in the print job is image data converted by a printer driver installed on an information processing apparatus such as a PC into a format recognizable to the MFP 1. The operation-display control unit 34 displays information on the display panel 24 or sends information input from the display panel 24 to the main control unit 30.

When the MFP 1 operates as a printer, the input/output control unit 32 receives a print job via the network I/F 28 first. The input/output control unit 32 transfers the received print job to the main control unit 30. When receiving the print job, the main control unit 30 controls the image processing unit 33, causing the image processing unit 33 to generate drawing data based on print data contained in the print job.

When the drawing data has been generated by the image processing unit 33, the engine control unit 31 causes an image to be formed on a sheet of paper fed from the paper feed table 25 based on the generated drawing data. Hence, the print engine 26 functions as the image forming unit. The paper on which the image is formed by the print engine 26 is output onto the paper discharge tray 27.

When the MFP 1 operates as a scanner, the operation-display control unit 34 or the input/output control unit 32 transfers a scan execution signal to the main control unit 30 according to a scan execution instruction input by an user by operating the display panel 24 or input from an external device via the network I/F 28. The main control unit 30 controls the engine control unit 31 according to the received scan execution signal.

The engine control unit 31 drives the ADF 21 to feed a document an image of which is to be captured and set in the ADF 21 to the scanner unit 22. The engine control unit 31 drives the scanner unit 22 to capture an image of the document fed by the ADF 21. When no document is set in the ADF 21 but a document is manually set in the scanner unit 22, the scanner unit 22 captures an image of the manually-set document under control of the engine control unit 31. In other words, the scanner unit 22 serves as an image capturing unit, and the engine control unit 31 functions as a read control unit.

The scanner unit 22 performs image capturing as follows. An image sensor such as a CCD included in the scanner unit 22 optically scans the document to generate captured-image data based on optical information. The engine control unit 31 transfers the captured-image data generated by the scanner unit 22 to the image processing unit 33. The image processing unit 33 generates image data by performing image processing on the captured-image data received from the engine control unit 31 under control of the main control unit 30.

The main control unit 30 stores the image data generated by the image processing unit 33 in a storage medium, such as the HDD 14, mounted on the MFP 1. In other words, the scanner unit 22, the engine control unit 31, and the image processing unit 33 operate in cooperation to function as an image input unit. The image data generated by the image processing unit 33 is kept to be stored in the HDD 14 or the like or transmitted to an external device via the input/output control unit 32 and the network I/F 28 according to an instruction given from a user.

When the MFP 1 operates as a copier, the image processing unit 33 generates drawing data based on captured-image data received by the engine control unit 31 from the scanner unit 22 or image data generated by the image processing unit 33. The engine control unit 31 drives the print engine 26 based on the drawing data as in the case where the MFP 1 operates as the printer. Meanwhile, in a case where drawing data and captured-image data are identical in information format, the captured-image data can be used as drawing data as it is.

Figure 3:
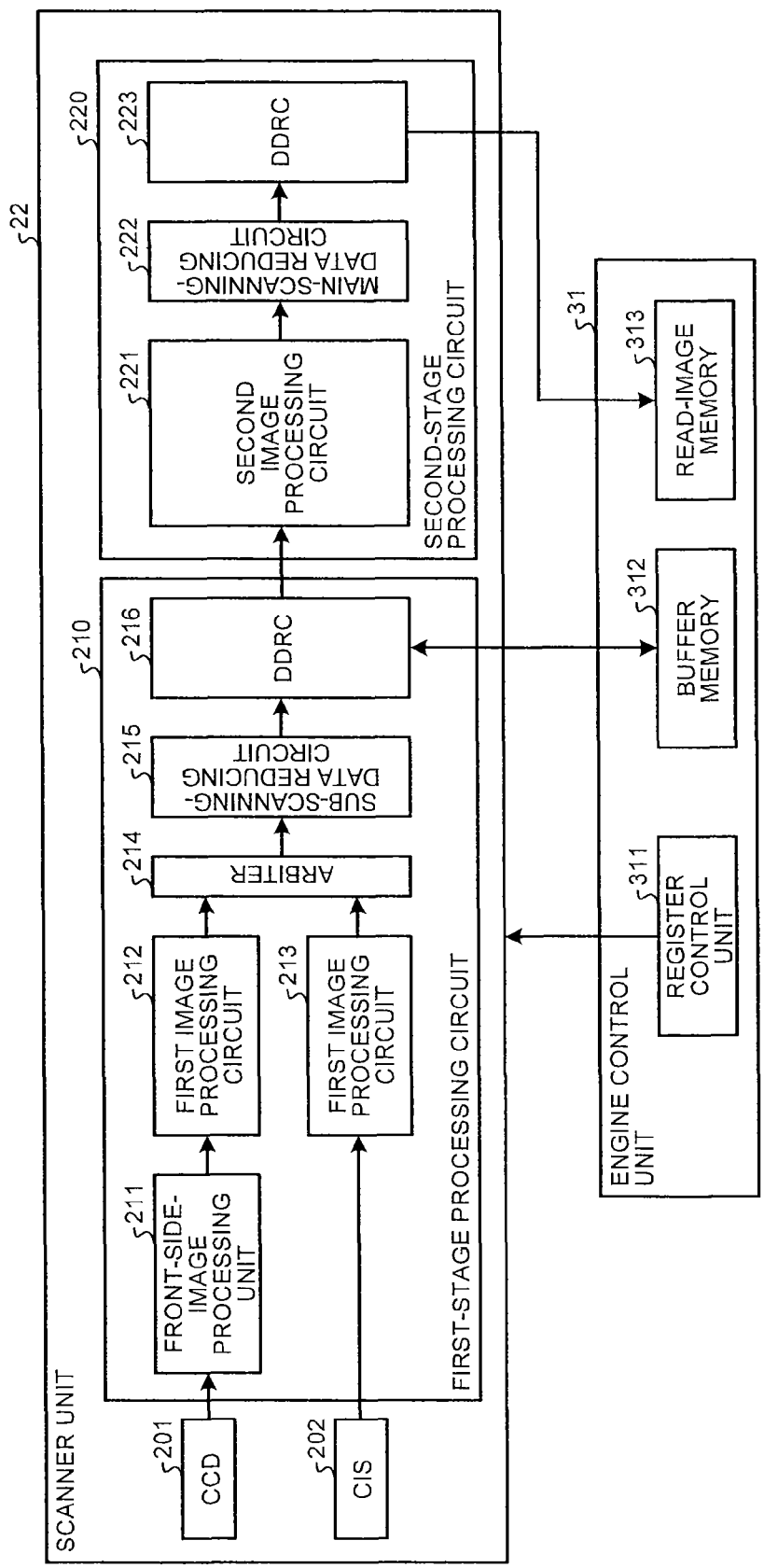
FIG. 3 is a diagram illustrating a configuration of a scanner unit according to the embodiment.

The configuration of the scanner unit 22 according to the present embodiment and how the scanner unit 22 is connected to the engine control unit 31 are described below with reference to FIG. 3. As illustrated in FIG. 3, the scanner unit 22 includes a charge coupled device (CCD) 201, a contact image sensor (CIS) 202, a first-stage processing circuit 210, and a second-stage processing circuit 220. Referring to FIG. 3, the first-stage processing circuit 210 and the second-stage processing circuit 220 function as a read-image processing device that transfers read data input from the CCD 201 and the CIS 202 to the controller 20 which is a main unit.

The engine control unit 31 is implemented via a combination of software and hardware as described above and includes a register control unit 311, a buffer memory 312, and a read-image memory 313. The buffer memory 312 and the read-image memory 313 are storage areas reserved in the RAM 11. The register control unit 311 is implemented by the CPU 10 by performing computations according to a program loaded into the RAM 11.

The CCD 201 is an image sensor for reading a front side of a document. The CIS 202 is an image sensor for reading a back side of the document. The first-stage processing circuit 210 is a circuit that obtains read data from the CCD 201 or the CIS 202 and performs processing on the read data. The second-stage processing circuit 220 is a circuit that performs processing on the read data input to the second-stage processing circuit 220 via the first-stage processing circuit 210 and outputs the processed data as captured-image data to the engine control unit 31.

The first-stage processing circuit 210 includes a front-side-image processing unit 211, a first image processing circuit 212, a first image processing circuit 213, an arbiter 214, a sub-scanning-data reducing circuit 215, and a double data rate controller (DDRC) 216. The second-stage processing circuit 220 includes a second image processing circuit 221, a main-scanning-data reducing circuit 222, and a DDRC 223.

The front-side-image processing unit 211 obtains read data input from the CCD 201, converts the read data into a same format as that of read data input from the CIS 202, and outputs the converted data to the first image processing circuit 212. This function of the front-side-image processing unit 211 allows downstream elements to process read data input from the CCD 201 and read data input from the CIS 202 without discriminating between them.

The first image processing circuit 212 performs predetermined image processing on read data that is output from the CCD 201 and input to the first image processing circuit 212 via the front-side-image processing unit 211. The first image processing circuit 213 performs predetermined image processing on read data output from the CIS 202. Although the first image processing circuit 212 and the first image processing circuit 213 are provided for read data output from the CCD 201 and read data output from the CIS 202, respectively, the first image processing circuits 212 and 213 are identical image processing circuits, and perform same image processing on the read data. The first image processing circuit 212 and the first image processing circuit 213 function as a first-stage image processing unit.

The arbiter 214 functions as a two-side-data arbitrating unit that arbitrates between data transfer of front-side read data input from the first image processing circuit 212 and data transfer of back-side read data input from the first image processing circuit 213, thereby inputting them alternately to the sub-scanning-data reducing circuit 215. The arbiter 214 inputs the read data alternately between, for example, a portion of the front-side read data corresponding to one scan line, which is along the main-scanning direction, and a portion of the back-side read data corresponding to one scan line to the sub-scanning-data reducing circuit 215.

The sub-scanning-data reducing circuit 215 is a sub-scanning-data reducing unit that performs scan-line thinning on the read data input to the sub-scanning-data reducing circuit 215 via the arbiter 214 based on a data-reduction ratio set according to control performed by the engine control unit 31, thereby reducing, or compacting, the read data in the sub-scanning direction. The sub-scanning-data reducing circuit 215 performs the scan-line thinning described above by not transferring downstream the read data input via the arbiter 214 on a scan-line-by-scan-line basis but discarding it.

The DDRC 216 is an auxiliary transfer unit that temporarily stores the read data input from the sub-scanning-data reducing circuit 215 in the buffer memory 312 of the engine control unit 31, and reads out the read data from the buffer memory 312 to transfer the read data to the second image processing circuit 221 of the second-stage processing circuit 220. This function of the DDRC 216 allows inputting read data to the second image processing circuit 221 at a frequency at which the second image processing circuit 221 executes the image processing, or, in short, at an internal frequency of the second image processing circuit 221.

The second image processing circuit 221 is an image processing unit that performs predetermined image processing on the read data input to the second image processing circuit 221 via the DDRC 216 and outputs the processed data as the captured-image data described above to the engine control unit 31. The image processing to be performed by the second image processing circuit 221 differs from processing performed by the first image processing circuits 212 and 213. The load placed by the image processing performed by the second image processing circuit 221 is higher than that of processing performed by the first image processing circuits 212 and 213.

The main-scanning-data reducing circuit 222 performs pixel thinning on the captured-image data output from the second image processing circuit 221 and input to the main-scanning-data reducing circuit 222 on a scan-line-by-scan-line basis based on the data-reduction ratio set according to control performed by the engine control unit 31, thereby reducing, or compacting, the read data in the main-scanning direction. The main-scanning-data reducing circuit 222 performs the pixel thinning described above by discarding pixels from pixels that make up a scan line of the captured-image data input from the second image processing circuit 221 on the scan-line-by-scan-line basis at pixel intervals that depend on the setting.

The DDRC 223 transfers the captured-image data input from the main-scanning-data reducing circuit 222 to the engine control unit 31 via the read-image memory 313, in which the captured-image data is to be stored, of the engine control unit 31. In other words, the DDRC 223 functions as a transfer unit. The scanner unit 22 configured as described above performs processing as described above, thereby reading images and generating captured-image data.

The constituents of the scanner unit 22 operate according to register setting set by the register control unit 311 of the engine control unit 31. The register control unit 311 controls, for example, data-reduction ratios for the sub-scanning-data reducing circuit 215 and the main-scanning-data reducing circuit 222, timing when the arbiter 214 switches between the front-side read data and the back-side read data, and parameters for use by the first image processing circuits 212 and 213 and the second image processing circuit 221 in the image processing.

As can be seen from the configuration in which the DDRC 216 and the buffer memory 312 are provided to synchronize input of the read data to the second image processing circuit 221 to the internal frequency of the second image processing circuit 221, the image processing performed by the second image processing circuit 221 makes up a large proportion in internal processing of the scanner unit 22.

Processing performed by the second image processing circuit 221 includes gamma correction that adjusts contrast of an image, sharpness correction that adjusts sharpness of the image, banding correction that corrects strips undesirably created on the image by scanning, and segmentation that partitions the image into a segment of characters and a segment of graphics, a picture, or the like.

Because these processing are high-load processing as described above, reducing an amount of data input to the second image processing circuit 221 to a minimum is desired. To achieve this, the method of compressing data and inputting the compressed data has conventionally been employed. The buffer memory 312 is used because it is difficult to input all of the front-side read data and the back-side read data to the second image processing circuit 221 in real time.

In contrast, the sub-scanning-data reducing circuit 215 is arranged upstream of the second image processing circuit 221 in the scanner unit 22 according to the present embodiment. Accordingly, the read data that is compacted in the sub-scanning direction, or, in other words, reduced in data amount as compared with document read data, is input to the second image processing circuit 221. This allows minimizing the amount of read data to be processed by the second image processing circuit 221, thereby reducing time required for scanning.

Figure 4:
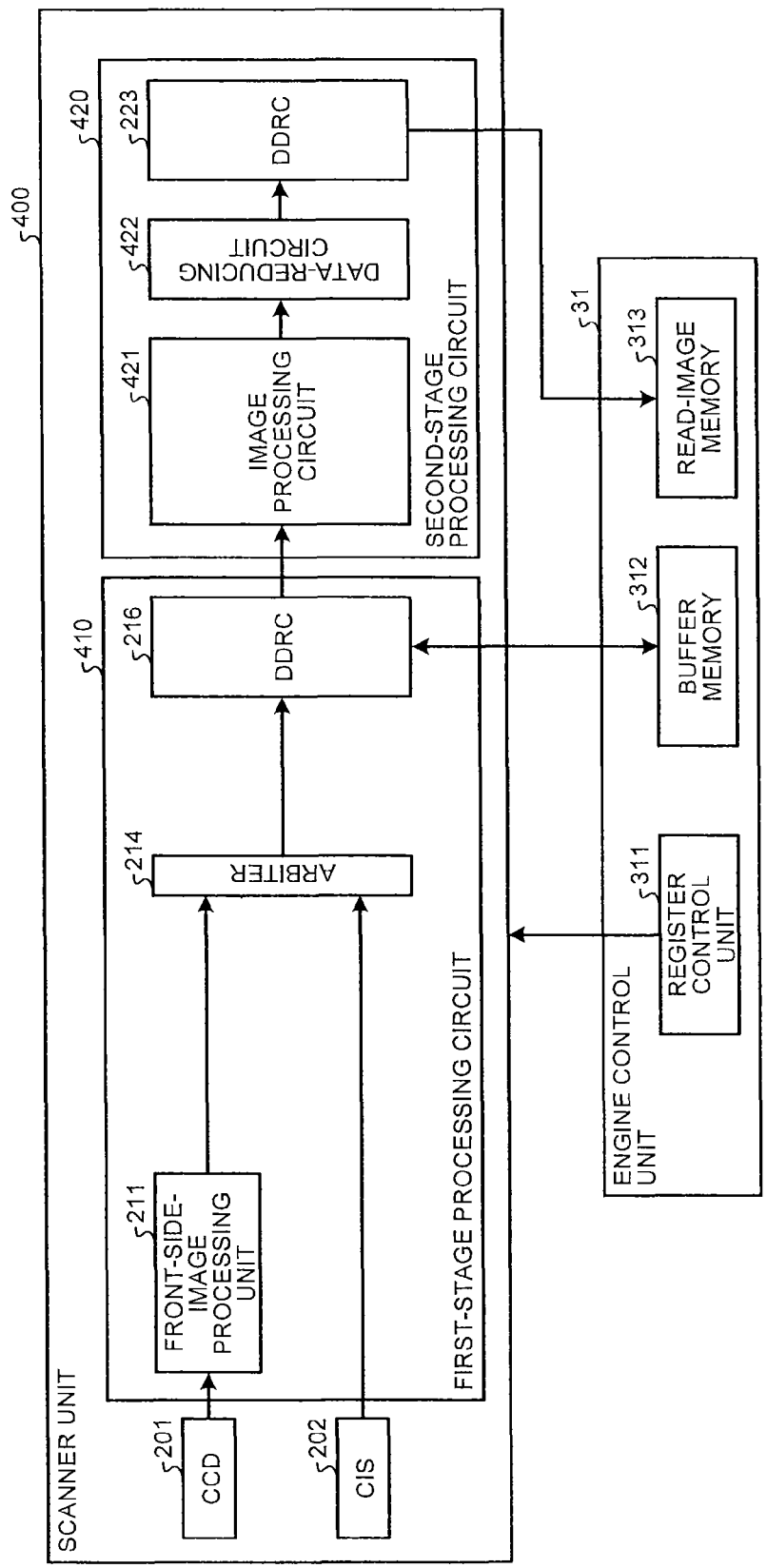
FIG. 4 is a diagram illustrating a configuration of a conventional scanner unit.

FIG. 4 illustrates a configuration of a conventional scanner unit 400. As illustrated in FIG. 4, a first-stage processing circuit 410 of the conventional scanner unit 400 includes only the front-side-image processing unit 211, the arbiter 214, and the DDRC 216 among the constituents of the first-stage processing circuit 210 according to the present embodiment. A second-stage processing circuit 420 of the conventional scanner unit 400 includes an image processing circuit 421 and a data-reducing circuit 422 in lieu of the second image processing circuit 221 and the main-scanning-data reducing circuit 222 of the second-stage processing circuit 220 according to the present embodiment.

The image processing circuit 421 has image processing functions performed by the first image processing circuits 212 and 213 and the second image processing circuit 221 according to the present embodiment. The data-reducing circuit 422 has both of a function of the sub-scanning-data reducing circuit 215 and that of the main-scanning-data reducing circuit 222 and performs data reduction in the main-scanning direction and in the sub-scanning direction.

In the conventional scanner unit 400 illustrated in FIG. 4, all of the read data output from the CCD 201 and that from the CIS 202 are input to the image processing circuit 421. Therefore, it is necessary to increase the storage area in the RAM 11 reserved for the buffer memory 312 so that all of the read data can be input, or to perform compression so that compressed data is input to the image processing circuit 421.

As a result, a problem that the storage area of the RAM 11 is undesirably occupied for the buffer memory 312 or a problem that circuit scale is increased because the compressed data needs to be decompressed in the second image processing circuit 221 arise. In contrast, in the scanner unit 22 according to the present embodiment, an image having undergone the data reduction in the sub-scanning direction as described above is input to the second image processing circuit 221. Accordingly, the problems can be solved.

As illustrated in FIG. 4, the data-reducing circuit for data reduction in the main-scanning direction and in the sub-scanning direction has conventionally been provided. Accordingly, the sub-scanning-data reducing circuit 215 is not provided as an addition to the conventional configuration. Therefore, the present embodiment can be implemented without increasing circuit scale.

Furthermore, the first image processing circuits 212 and 213 that perform a part of the functions of the conventional image processing circuit 421 is arranged upstream of the sub-scanning-data reducing circuit 215 in the scanner unit 22 according to the present embodiment. Hence, the image processing that is desirably performed on the document scanned data that has not yet undergone the data reduction in the sub-scanning direction, or, more specifically, that has not yet undergone the scan-line thinning according to setting, is arranged upstream of the sub-scanning-data reducing circuit 215. Therefore, accuracy in image processing can be maintained.

Examples of image processing to be performed by the first image processing circuits 212 and 213 include image processing, such as moire pattern removal and tilt correction, that is performed based on values of pixels that make up the image. These image processing functions do not require large circuit scale. Accordingly, the first image processing circuits 212 and 213 are provided at a stage, which is upstream of arbitration performed by the arbiter 214, where the front-side read data and the back-side read data are processed in parallel rather than immediately upstream of the sub-scanning-data reducing circuit 215. This configuration allows distributing processing to the first image processing circuits 212 and 213, thereby lightening load.

Each of the first image processing circuits 212 and 213 according to the present embodiment also performs a copying-prohibited-image detecting process. In this process, an image, such as valuable papers, copying thereof should not be performed is detected and read data representing the copying-prohibited image is discarded. In the conventional configuration where the copying-prohibited-image detecting process is performed in the image processing circuit 421 of the second-stage processing circuit 420, the DDRC 216 of the first-stage processing circuit 410 causes the read data to be temporarily stored in the buffer memory 312. Accordingly, a skilled person can obtain the image data that should be discarded by accessing the read data flowing through a bus or stored in the buffer memory 312.

In contrast, in the scanner unit 22 according to the present embodiment, a condition where read data that is not yet subjected to the copying-prohibited-image detecting process is stored in the buffer memory 312 via the bus does not occur. Accordingly, the scanner unit 22 can solve the problem described above.

Figure 5:
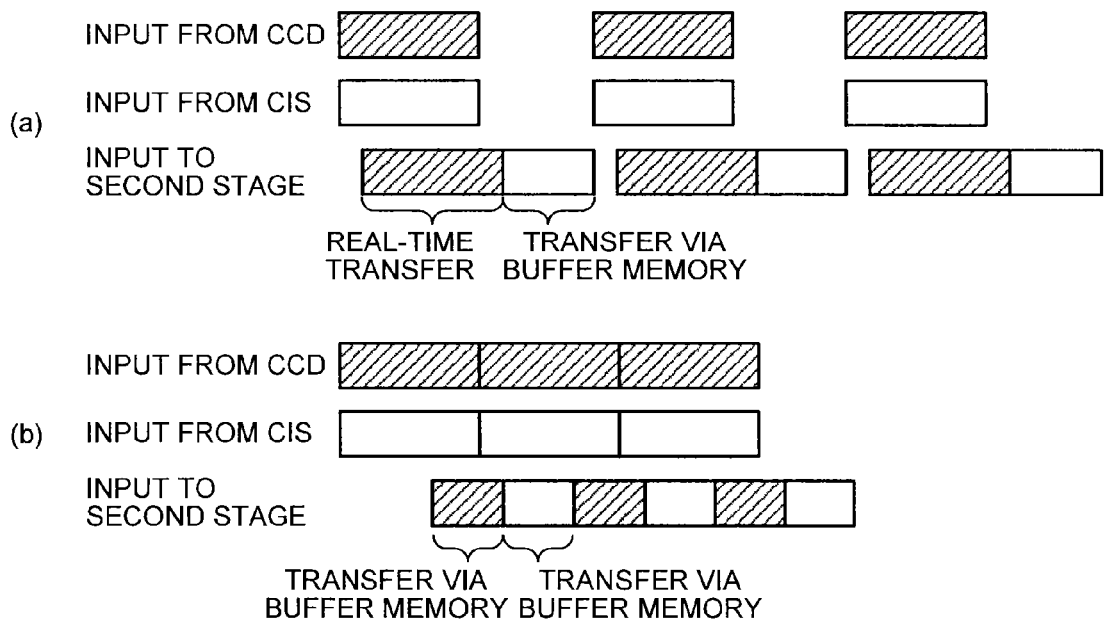
FIG. 5 illustrates enhanced efficiency in transfer of read data according to the embodiment, compared with data transfer by a conventional scanner unit.

Effects achieved by the present embodiment are described below with reference to FIG. 5. Illustrated in (a) of FIG. 5 is an example data transfer timing in the conventional scanner unit 400 illustrated in FIG. 4. "INPUT FROM CCD" indicates timing when read data is input from the CCD 201 to the first-stage processing circuit 410. "INPUT FROM CIS" indicates timing when read data is input from the CIS 202 to the first-stage processing circuit 410. "INPUT TO SECOND STAGE" indicates timing when read data is input from the first-stage processing circuit 410 to the second-stage processing circuit 420.

In FIG. 5, a single rectangle represents data of one page being transferred. Data transfer of read data input from the CCD 201 is indicated by hatched rectangles. Data transfer of read data input from the CIS 202 is indicated by open rectangles. FIG. 5 illustrates a mode in which the DDRC 216 inputs front-side read data and back-side read data to the second image processing circuit 221 alternately between a front side and a back side; however, this is only an example. The DDRC 216 can switch data every predetermined number of lines.

In the example illustrated in (a) of FIG. 5, the read data input from the CCD 201 is processed by the first-stage processing circuit 410 and then transferred to the second-stage processing circuit 420 in real time. Accordingly, the front-side read data input from the CCD 201 is input to the second image processing circuit 221 over a similar period of time to time over which the read data is input from the CCD 201 to the first-stage processing circuit 410 with a delay corresponding to processing time of the first-stage processing circuit 210 from when "INPUT FROM CCD" is made.

The read data input from the CIS 202 is stored in the buffer memory 312, and thereafter read out from the buffer memory 312 and transferred. The back-side read data input from the CIS 202 is transferred utilizing an interval (hereinafter, "scan interval time") between scanning of one sheet of a document and scanning of the next sheet.

The conventional scanner unit 400 illustrated in FIG. 4 requires scan interval time for transfer of the back-side read data to prevent data loss. This causes scanning linear velocity, or, more specifically, an amount of image data that can be transferred per unit time, to decrease.

In contrast, in the scanner unit 22 according to the present embodiment, an amount of data input to the second-stage processing circuit is reduced by the sub-scanning-data reducing process performed by the sub-scanning-data reducing circuit 215. Illustrated in (b) of FIG. 5 is an example where the amount of data is reduced in half by the sub-scanning-data reducing process. As a result, time required to make "INPUT TO SECOND STAGE" is reduced, and efficient data transfer is enabled.

Furthermore, the scanner unit 22 according to the present embodiment transfers the front-side read data at a transfer rate similar to transfer time of the back-side read data by transferring the front-side read data via the buffer memory 312 rather than transferring the front-side read data in real time at a rate that depends on the input rate from the CCD 201. In other words, transfer time for "INPUT TO SECOND STAGE" of the front-side read data and that of the back-side read data are equalized.

When the mode illustrated in (a) of FIG. 5 is employed, a long period of time cannot be reserved for making "INPUT TO SECOND STAGE" of the back-side read data because a larger proportion of time is spent to make "INPUT TO SECOND STAGE" of the front-side read data. This is a factor that prevents reduction in scan interval time. However, this problem can be solved by equalizing transfer time required to make "INPUT TO SECOND STAGE" of the front-side read data and that of the back-side read data as described above.

Figure 6:
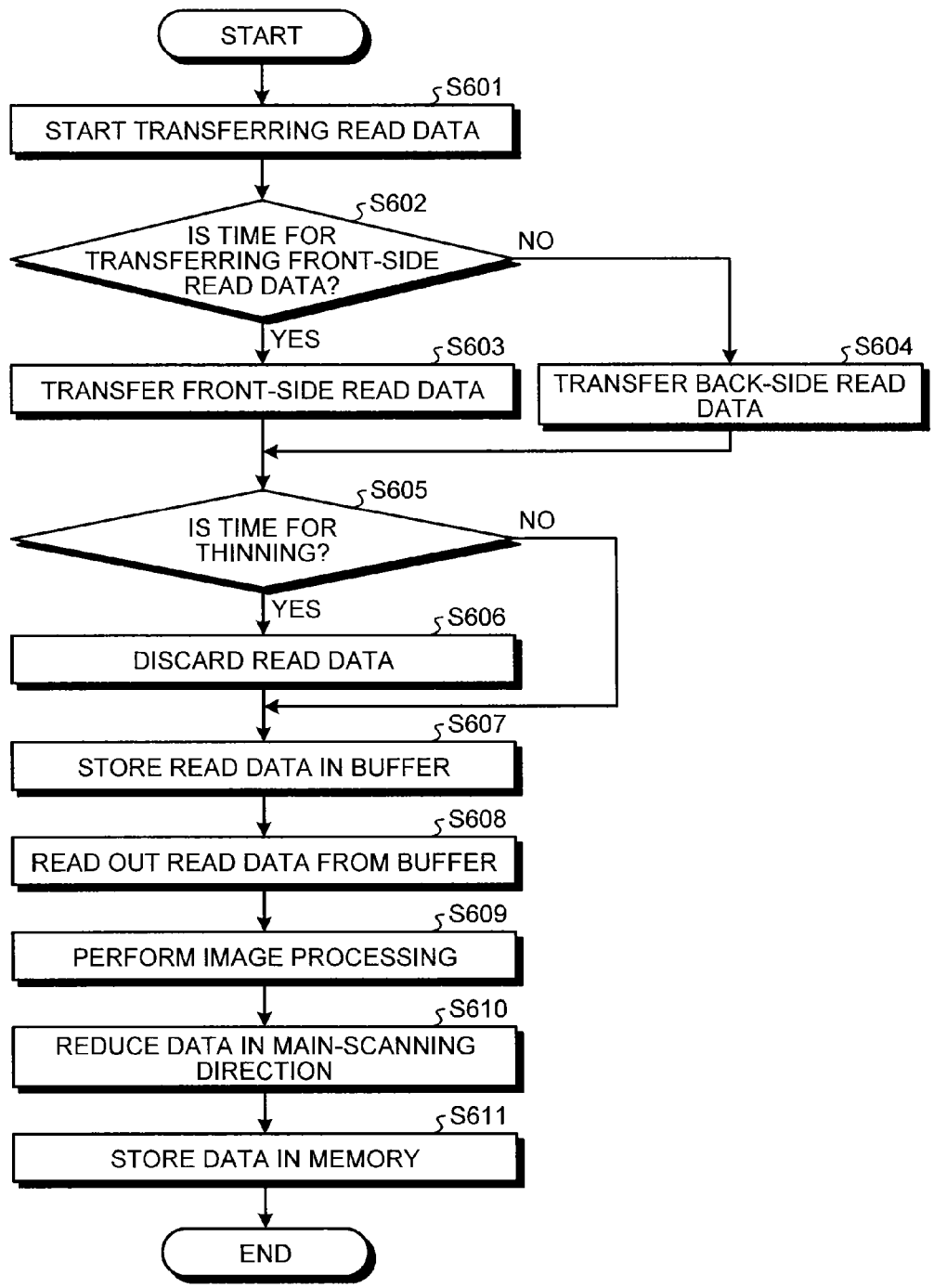
FIG. 6 is a flowchart illustrating an operation of the scanner unit according to the embodiment.

FIG. 6 is a flowchart illustrating an operation of the scanner unit 22 according to the present embodiment. As illustrated in FIG. 6, when scanning is started and transfer of read data from the CCD 201 and the CIS 202 is started (step S601), the read data is input to the arbiter 214 via the first image processing circuits 212 and 213. The arbiter 214 determines whether it is time for transferring the front-side read data or time for transferring the back-side read data (step S602). When the arbiter 214 determines that it is time for transferring the front-side read data (YES at step S602), the arbiter 214 transfers the front-side read data (step S603). When the arbiter 214 determines that it is time for transferring the back-side read data (NO at step S602), the arbiter 214 transfers the back-side read data (step S604).

The read data transferred downstream by the arbiter 214 is input to the sub-scanning-data reducing circuit 215. The sub-scanning-data reducing circuit 215 determines whether it is time for line thinning based on setting (step S605). When the sub-scanning-data reducing circuit 215 determines that it is time for the thinning (YES at step S605), the sub-scanning-data reducing circuit 215 discards the input read data (step S606).

The read data transferred downstream by the sub-scanning-data reducing circuit 215 rather than being discarded is stored in the buffer memory 312 (step S607). The read data is read out from the buffer memory 312 according to operation timing of the second image processing circuit 221 (step S608). The second image processing circuit 221 performs image processing on the read-out read data (step S609), and transfers the processed data as captured-image data to the main-scanning-data reducing circuit 222.

The main-scanning-data reducing circuit 222 receives the captured-image data and performs the data reduction in the main-scanning direction on the captured-image data (step S610), and transfers the data-reduced captured-image data to the DDRC 223. The DDRC 223 stores the captured-image data in the read-image memory 313 (step S611). The operation of the scanner unit 22 according to the present embodiment is completed.

As described above, in the scanner unit 22 according to the present embodiment, the sub-scanning-data reducing circuit 215 that reduces an image in the sub-scanning direction is arranged upstream of the second image processing circuit 221 that performs relatively-high-load image processing with respect to a data flow of the read data input from the image sensors. Accordingly, because an amount of data input to the second image processing circuit 221 is reduced, the need of compressing data input to the second image processing circuit 221 is eliminated. Furthermore, the capacity of the buffer memory 312 can be reduced.

Furthermore, the need of restricting the input frequency at which read data is input from the CCD 201 and the CIS 202 is eliminated. Accordingly, it becomes possible to increase scanning linear velocity and reduce time that elapses before scanning is completed. Thus, the scanner unit 22 according to the present embodiment can enhance efficiency in transfer of read-image data of a scanner capable of two-sided reading.

In the embodiment described above, the buffer memory 312 is reserved on the RAM 11. Alternatively, the buffer memory 312 can be implemented on other memory module than the RAM 11.

In the embodiment described above, the main-scanning-data reducing circuit 222 is arranged downstream of the second image processing circuit 221. This is because the higher the resolution in the main-scanning direction, the more accurate processing after the first image processing circuits 212 and 213 and the second image processing circuit 221 can perform.

However, the image processing is not impracticable at a stage downstream of the main-scanning-direction data reduction. Therefore, a configuration in which not only the data reduction in the sub-scanning direction but also the data reduction in the main-scanning direction are performed upstream of the second image processing circuit 221 can be employed. This configuration leads to further reduction in the amount of read data input to the second image processing circuit 221.

In the embodiment, the DDRC 216 transfers the read data having undergone the data reduction in the sub-scanning direction performed by the sub-scanning-data reducing circuit 215 to the second image processing circuit 221. Alternatively, as illustrated in FIG. 7, a configuration that includes a DDRC 217 having a sub-scanning-data reducing function instead of the sub-scanning-data reducing circuit 215 can be employed.

Figure 7:
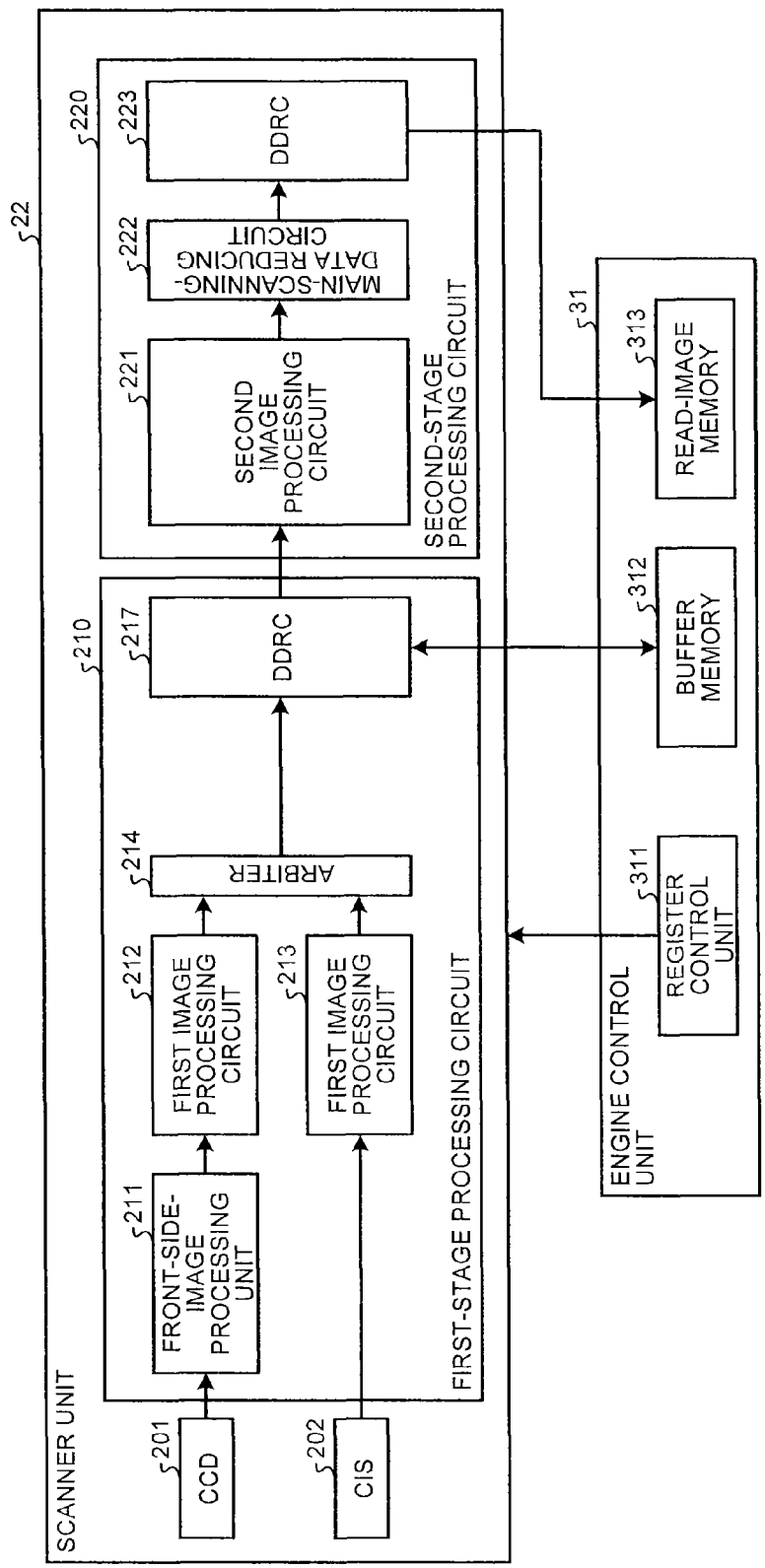
FIG. 7 is a diagram illustrating a configuration of a scanner unit according to another embodiment of the present invention.

The DDRC 217 illustrated in FIG. 7 stores read data input from the arbiter 214 in the buffer memory 312 on the scan-line-by-scan-line basis. When reading out the read data from the buffer memory 312 to transfer it to the second image processing circuit 221, the DDRC 217 performs scan-line thinning by discarding a part corresponding to one or more scan lines, which depends on the data-reduction ratio set by the register control unit 311, of the read data, thereby performing data reduction in the sub-scanning direction. In other words, the DDRC 217 functions not only as the auxiliary transfer unit but also as the sub-scanning-data reducing unit.

Such a mode can be implemented by controlling an address to which the DDRC 217 accesses to read out the read data from the buffer memory 312, and therefore can be implemented with simple processing. This mode also allows simplifying the circuit configuration as compared with the mode illustrated in FIG. 3.

The DDRC 217 can perform the data reduction in the sub-scanning direction when the DDRC 217 stores the read data input from the arbiter 214 in the buffer memory 312 on the scan-line-by-scan-line basis. More specifically, a mode in which only a part of the read data input from the arbiter 214 is stored in the buffer memory 312 according to the data-reduction ratio set by the register control unit 311 can be employed. Although this mode in which the line thinning is performed before the read data is stored in the buffer memory 312 is substantially the same as the mode illustrated in FIG. 3, this mode enables simplifying the circuit configuration by combining the sub-scanning-data reducing circuit 215 and the DDRC 216 into one piece.

According to the embodiments, efficiency in transfer of read-image data of a scanner capable of two-sided reading can be enhanced.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
a two-side-data arbitrating unit configured to obtain read data on a main-scan-line-by-main-scan-line basis from a first image sensor that reads one side of a document and read data on a main-scan-line-by-main-scan-line basis from a second image sensor that reads the other side of the document, the two-side-data arbitrating unit transferring a piece of read data obtained from the first image sensor and a piece of read data obtained from the second image sensor alternately;
a sub-scanning-data reducing unit configured to perform reduction in image data including the read data in a sub-scanning direction in a way that discards the transferred piece of read data corresponding to a main scan line according to setting to perform thinning on the pieces of read data corresponding respectively to main scan lines;
an image processing unit configured to perform image processing on the read data having undergone the thinning; and
a transfer unit configured to transfer the read data having undergone the image processing to another unit.

2. The image reading device according to claim 1, further comprising a first-stage image processing unit configured to perform image processing on the read data obtained by the first image sensor and the second image sensor, the image processing having an accuracy that depends on resolution in the sub-scanning direction, wherein
the two-side-data arbitrating unit obtains the read data having undergone the image processing performed by the first-stage image processing unit on a main-scan-line-by-main-scan-line basis as the read data to be transferred.

3. The image reading device according to claim 2, wherein the first-stage image processing unit detects a copying-prohibited image based on the read data.

4. The image reading device according to claim 1, further comprising an auxiliary transfer unit configured to temporarily store the read data having undergone the thinning in a storage medium, the auxiliary transfer unit reading and transferring the stored read data to the image processing unit according to a processing timing of the image processing unit, wherein the image processing unit performs the image processing on the read data transferred by the auxiliary transfer unit.

5. The image reading device according to claim 1, wherein the sub-scanning-data reducing unit temporarily stores the transferred read data in a storage medium, and reads and transfers the stored read data to the image processing unit according to a processing timing of the image processing unit, and when reading the stored read data, the sub-scanning-data reducing unit reads a part of the read data and discards remaining part of the read data to perform thinning on the pieces of read data.

6. The image reading device according to claim 4, wherein the read data obtained by the first image sensor and the read data obtained by the second image sensor are transferred at a same transfer frequency by reading the read data stored in the storage medium and transferring the read data to the image processing unit.

7. The image reading device according to claim 5, wherein the read data obtained by the first image sensor and the read data obtained by the second image sensor are transferred at a same transfer frequency by reading the read data stored in the storage medium and transferring the read data to the image processing unit.

8. An image reading method comprising:
- obtaining read data on a main-scan-line-by-main-scan-line basis from a first image sensor that reads one side of a document and read data on a main-scan-line-by-main-scan-line basis from a second image sensor that reads the other side of the document;
- transferring a piece of read data obtained from the first image sensor and a piece of read data obtained from the second image sensor alternately;
- performing reduction in image data including the read data in a sub-scanning direction in a way that discards the transferred piece of read data corresponding to a main scan line according to setting to perform thinning on the pieces of read data corresponding respectively to main scan lines;
- performing image processing on the read data having undergone the thinning; and
- transferring the read data having undergone the image processing to another unit.

\* \* \* \* \*